United States Patent
Weidlich et al.

(10) Patent No.: US 9,062,908 B2
(45) Date of Patent: Jun. 23, 2015

(54) SYSTEM FOR THE OPERATION AND MANAGEMENT OF A FLEET OF REFRIGERATED AUTONOMOUS CONTAINERS

(75) Inventors: Jochen Weidlich, Rastatt (DE); Dominique Jouvaud, Paris (FR); Michel Kostelitz, Versailles (FR); Serge Morel-Jean, Montigny-le-Bretonneux (FR)

(73) Assignee: L'Air Liquide Société Anonyme pour l'Étude Et l'Exploitation des Procedes Georges Claude, Paris (FR)

( * ) Notice: Subject to any disclaimer, the term of this patent is extended or adjusted under 35 U.S.C. 154(b) by 1369 days.

(21) Appl. No.: 12/162,644
(22) PCT Filed: Jan. 15, 2007
(86) PCT No.: PCT/FR2007/050647
§ 371 (c)(1), (2), (4) Date: Jul. 30, 2008
(87) PCT Pub. No.: WO2007/085755
PCT Pub. Date: Aug. 2, 2007

(65) Prior Publication Data
US 2009/0006222 A1  Jan. 1, 2009

(30) Foreign Application Priority Data
Jan. 30, 2006 (EP) .................................. 06300079

(51) Int. Cl.
*G06Q 20/00* (2012.01)
*G06Q 10/10* (2012.01)
(Continued)

(52) U.S. Cl.
CPC ............ *F25D 29/003* (2013.01); *G06Q 20/203* (2013.01); *G06Q 10/08* (2013.01);
(Continued)

(58) Field of Classification Search
CPC ... G06Q 20/203; G06Q 10/087; G06Q 10/08; G06Q 30/06; G06Q 20/202; G06Q 10/0875; G06Q 10/06

USPC ..................................................... 705/28, 22
See application file for complete search history.

(56) References Cited

U.S. PATENT DOCUMENTS 5,000,484 A * 3/1991 Phelan et al. .................... 283/75
5,363,670 A * 11/1994 Bartilucci ....................... 62/166
(Continued)

FOREIGN PATENT DOCUMENTS

FR      2 839 774       11/2003
WO      WO 2004/107258  12/2004

OTHER PUBLICATIONS

Refrigerated Transportation: CFC's and the environment by Fischer Dieter, FoodReview 14.2 Apr.-Jun. 1991: 27.*
(Continued)

*Primary Examiner* — Matthew Gart
*Assistant Examiner* — Harshad Parikh
(74) *Attorney, Agent, or Firm* — Christopher J. Cronin

(57) ABSTRACT

System for the operation and management of a fleet of refrigerated autonomous containers for transporting perishable goods, comprising: containers provided with a passive tag comprising identification information and with an active tag comprising a temperature probe and a recorder connected to said probe and capable of recording the measured temperature values; a gun or means for injecting a refrigerant into the container, which means is provided with a device capable of reading the passive tag of the container, so as to be cognizant of the identification number of the passive tag; and a data acquisition and processing unit capable of carrying out the following operations: receiving said identification information from said device and linking this identification number of the passive tag with the number of the active tag in the container; calculating, as a function of data associated with the logistic travel of the container and physical data of a refrigerant, an amount of liquefied gas to be injected into the container; and providing said gun or injection means with the characteristics of the injection of liquefied gas to be injected into the container.

11 Claims, 1 Drawing Sheet

(51) Int. Cl.
  *F25D 29/00* (2006.01)
  *G06Q 10/08* (2012.01)
  *G06Q 30/06* (2012.01)
  *G06Q 10/06* (2012.01)
  *F25D 3/10* (2006.01)
  *G06Q 20/20* (2012.01)

(52) U.S. Cl.
  CPC ............ *G06Q 30/06* (2013.01); *G06Q 20/202* (2013.01); *G06Q 10/0875* (2013.01); *G06Q 10/06* (2013.01); *F25D 3/10* (2013.01); *F25D 2700/12* (2013.01); *G06Q 10/087* (2013.01)

(56) References Cited

U.S. PATENT DOCUMENTS

| | | | | |
|---|---|---|---|---|
| 5,823,234 | A * | 10/1998 | Boertz | 141/67 |
| 5,831,519 | A * | 11/1998 | Pedersen et al. | 340/425.5 |
| 6,003,322 | A * | 12/1999 | Graham | 62/52.1 |
| 6,464,099 | B1 | 10/2002 | Portman et al. | 220/712 |
| 6,483,427 | B1 * | 11/2002 | Werb | 340/10.1 |
| 6,563,417 | B1 * | 5/2003 | Shaw | 340/10.1 |
| 6,751,525 | B1 * | 6/2004 | Crisp, III | 700/241 |
| 6,813,898 | B2 * | 11/2004 | Lindsay et al. | 62/228.4 |
| 7,191,777 | B2 * | 3/2007 | Brand et al. | 128/200.23 |
| 7,274,289 | B2 * | 9/2007 | Kerr et al. | 340/500 |
| 7,286,043 | B2 * | 10/2007 | Carrender et al. | 340/10.42 |
| 7,316,123 | B2 * | 1/2008 | Gano | 62/371 |
| 7,382,262 | B2 * | 6/2008 | Commagnac et al. | 340/572.1 |
| 7,389,255 | B2 * | 6/2008 | Formisano | 705/7.23 |
| 7,415,428 | B2 * | 8/2008 | Garwood | 705/26.5 |
| 7,456,418 | B1 * | 11/2008 | Stevens et al. | 250/506.1 |
| 7,525,431 | B2 * | 4/2009 | Britton et al. | 340/572.1 |
| 7,693,725 | B2 * | 4/2010 | Trout et al. | 705/317 |
| 7,772,981 | B1 * | 8/2010 | Lambert et al. | 340/572.8 |
| 8,494,922 | B2 * | 7/2013 | Carlin et al. | 705/26.7 |
| 8,696,151 | B1 * | 4/2014 | Barakat | 362/129 |
| 2002/0161776 | A1 * | 10/2002 | Lanfredi et al. | 707/101 |
| 2003/0029179 | A1 * | 2/2003 | Vander Woude et al. | 62/201 |
| 2004/0233054 | A1 | 11/2004 | Neff et al. | |
| 2007/0061049 | A1 * | 3/2007 | Masuda et al. | 700/291 |
| 2007/0078637 | A1 * | 4/2007 | Martin et al. | 703/6 |
| 2007/0088570 | A1 * | 4/2007 | Shetty et al. | 705/2 |
| 2008/0120129 | A1 * | 5/2008 | Seubert et al. | 705/1 |
| 2009/0012825 | A1 * | 1/2009 | Ng | 705/7 |
| 2009/0118859 | A1 * | 5/2009 | Whaley et al. | 700/214 |
| 2009/0119025 | A1 * | 5/2009 | Whaley et al. | 702/23 |
| 2009/0138313 | A1 * | 5/2009 | Morgan et al. | 705/8 |
| 2009/0277199 | A1 * | 11/2009 | Manas et al. | 62/129 |
| 2009/0306639 | A1 * | 12/2009 | Nevo et al. | 606/21 |
| 2010/0076835 | A1 * | 3/2010 | Silverman | 705/14.33 |
| 2010/0286955 | A1 * | 11/2010 | VanGilder et al. | 702/182 |
| 2012/0191476 | A1 * | 7/2012 | Reid et al. | 705/3 |
| 2013/0275263 | A1 * | 10/2013 | Carlin et al. | 705/26.8 |
| 2014/0149270 | A1 * | 5/2014 | Lombard et al. | 705/34 |
| 2014/0156455 | A1 * | 6/2014 | Atwood et al. | 705/26.25 |
| 2014/0207501 | A1 * | 7/2014 | Albee et al. | 705/7.11 |

OTHER PUBLICATIONS

Cool it . . . but not too much by Birkland, Carol Fleet Equipment 20.9 (Sep. 1994): 29.*
Suppliers Marketplace Annonymous: Dairy Field 187.9 (Sep. 2004) 67-74.*
International Search Report for PCT/FR2007/050647.

* cited by examiner

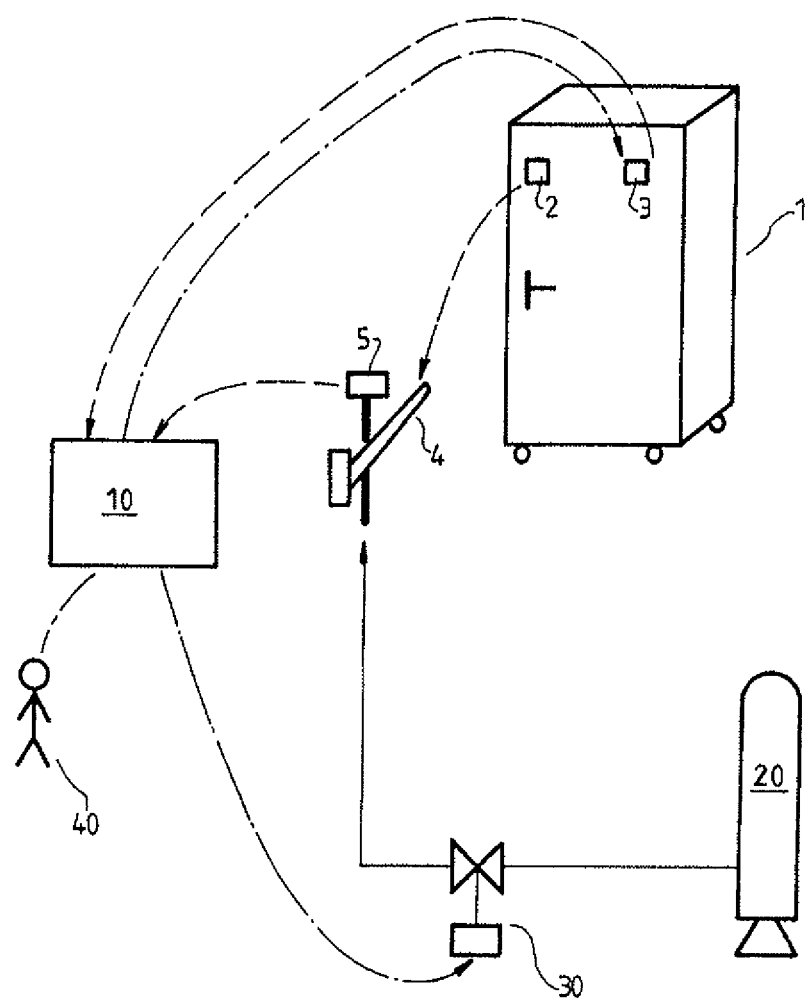

SYSTEM FOR THE OPERATION AND MANAGEMENT OF A FLEET OF REFRIGERATED AUTONOMOUS CONTAINERS

CROSS-REFERENCE TO RELATED APPLICATIONS

This application is a §371 of International PCT Application PCT/FR2007/050647, filed Jan. 15, 2007.

BACKGROUND

The invention relates to the field of the transport or distribution of perishable foodstuffs and other pre-cooked dishes or foods, in isothermal containers, be they for example container crates or lorries, where the cold chain is maintained by the intervention of a chilling fluid (cold gas, cryogenic liquid such as liquid nitrogen, dry ice, etc.).

Thus by way of example, central kitchens or distribution centers use isothermal trolleys to transport and distribute pre-cooked dishes or foods from their kitchens or facilities to the places of consumption: hospital catering, company or school restaurants, etc., etc.

The very numerous configurations of containers and of types of cooling which are available on the market will not be exhaustively detailed here, in particular the isothermal container/trolley types, with or without demarcated cryogenic compartment, with or without a reservoir ("cassette") comprising the cold fluid to be inserted into the container, etc.

Likewise, the chilling fluid (gas, cryogenic liquid, solid, be it nitrogen, $CO_2$ or other, etc.) can be deposited directly in the container, or in a reservoir to be inserted into the container, or sent to an exchanger situated in the container, or else, still by way of illustration, sent to a holder, situated in the container itself or in proximity (or else adjoining, for example when the container is a lorry), from which holder fluid is tapped off so as to send it to the container, to a reservoir situated in the container, to an exchanger situated in the container, etc., etc.

It is seen on reading the foregoing that the situations and configurations are extremely varied.

By way of illustration it may nevertheless be pointed out that cryogenic trolleys/containers are typically of parallelepipedal form and very often comprise a cryogenic compartment disposed in the upper part of the container, above the storage compartment wherein are disposed the products having to be preserved at controlled temperature, and traditionally, this upper compartment receives a reservoir intended to contain a refrigerating product, for example carbon dioxide in the solid phase, whose sublimation releases cold gases, compensating for the entry of heat through the seals between the container and its door or else through the insulant of the container. The pre-cooked dishes (or other perishable products) are then housed in the product storage compartment of these isothermal containers, which are themselves transported in lorries to the user site (hospital, school canteen, etc.).

It is well known that the regulations in force relating to compliance with the cold chain when transporting perishable foodstuffs are becoming increasingly rigorous, and are causing in particular those involved in such food distribution to evolve in terms of preparation and traceability of the products to be transported.

In practice, it is noted that the operator charged with injecting the fluid into each container, for example into each container crate, performs it in a relatively empirical manner, at best as a function of a certain number of pre-established "recipes" (buttons at the level of the injection cabinet that he actuates allowing the implementation of different and predetermined durations of injection).

Now, experience shows that the quantity of fluid required in each case depends on numerous factors which are not currently taken into account sufficiently well, and which are related in particular to the container's journey between its loading and its final place of use ("logistic" journey).

It is then appreciated that approximate procedures such as these will be less and less compatible with the growing demands of the new regulations which ask for much more rigorous control and tracking of the temperatures the whole way along the journey of such containers, or indeed of each container.

SUMMARY OF THE INVENTION

One of the objectives of the present invention is thus to propose a new procedure for managing such containers, and in particular their loading with chilling fluid, making it possible to improve the situation described above.

As will being seen below in greater detail, the present invention affords a technical solution to the problem mentioned above through a novel system for managing such containers (for example isothermal container crates or else lorries) making it possible to differentiate a given container, within a population of containers, which in the current state of this art is absolutely not carried out.

Such differentiation alone actually makes it possible to adapt the injection and to automate it by taking account in particular of the following criteria:
- the distances between the kitchens or facilities and the final delivery points;
- the physical data of the containers and those of the chilling fluid;
- the durations of waiting at the various stages, of transport, and the consumption or delivery times;
- the holding temperatures sought;
- the surrounding exterior conditions;
- etc., etc.

As will also be seen below in greater detail, the present invention affords a technical solution which makes it possible to inform and alarm the users in a simple manner, of the temperature overshoots inside the container during the various transport phases, and which makes it possible to chart locally in each container the temperature values and the overshoot alarms.

According to the present invention, each container is equipped with a combination of a passive identification Tag and of an active Tag for measuring temperatures. And it will be seen below that alone this combination of the two types of Tag makes it possible to achieve the sought-after differentiation and therefore the sought-after effectiveness.

It will be recalled that the literature speaks equally of RFID (for Radio Frequency IDentification) "Tag" or "chip" or "microchip".

Not too much consideration will be given here to these devices which are well known to the person skilled in the art, which are well catalogued and commercially available in multiple forms:

They are termed "passive" when they are not furnished with their own battery or cell or energy source, so they cannot emit data by themselves without having been invoked by an antenna that activated them (antenna of the reading apparatus which emits a radio signal to activate and identify the Tag, and to write or read data).

These passive Tags contain on the other hand a sort of electronic signature able to be transmitted to a supervision system when the Tag is invoked.

However, in practice their range is very low (less than 2 meters).

They are termed "active" when conversely they are furnished with their own energy source (battery), and therefore capable of emitting by themselves, even without being invoked to do so.

On the other hand their range can commonly reach a hundred meters.

According to the present invention:

the gun or system for injecting the chilling fluid (be it cold gas, cryogenic liquid, or else solid) into the container is furnished with a passive Tag reader and with its associated antenna (or else with an antenna able to read the passive Tag of the container which is presented to it, which antenna is connected to a remote passive Tag reader), so as to automatically read the identification number of the passive Tag in question;

the gun or injection system transmits this identification item of information to a data acquisition and processing unit (supervisor), which will link the passive Tag identification number which has been transmitted to it with the active Tag number situated in the same container concerned;

the installation is additionally furnished with a reader furnished with an antenna which makes it possible to read the data of the active Tag concerned (this reader is situated at any appropriate location of the installation, for example in the supervisor, and in any event at a location within the range of the active Tag concerned).

As seen above, the concept of fluid injection "into the container" can take multiple forms (into the container proper, into a cryogenic reservoir, into an exchanger, into a buffer holder, etc.).

The active Tag advantageously comprises a temperature probe, as well as a recorder transponder making it possible to store the temperature measurements at a frequency defined as a function of the requirements for a determined time as well as a database containing the characteristics of the container.

It will be noted that several configurations may be envisaged: a temperature probe integrated into the body of the active Tag, or even a remote probe, linked to the body of the Tag by a cable. In all cases it is appreciated that at the very least the probe part must be positioned at an appropriate location of the container so as to be able to provide measurements representative of the temperature prevailing in the product storage surroundings.

The assembly is linked to the data acquisition and processing unit, able to receive the data and events, process them, to ensure good communication with all current information systems, but also to automatically control the fluid injection, that is to say to prescribe the gun or injection means—or the system of valves managing the supply to the gun—the characteristics of the fluid injection (quantity, duration, etc.).

The data of the logistic journey of each container are advantageously stored in a database at the level of the supervisor, linking the data of the logistic journey to the identification number recorded on the passive Tag of the container concerned. By taking account of these data of the logistic journey and of the physical data of the fluid, a quantity of fluid is calculated and injected into the container concerned.

To summarize, the supervisor can pick out each container, recover the temperature recordings, read the process information recorded in the Tag, manage the fluid injection, write to the active Tag the data relating to the process (for example instructions: the Tag must measure and store the temperature prevailing in the container from such and such a moment and with such and such a periodicity), instigate the recording of the temperatures, etc. but also store all the information and make it available to the interested parties through the current communication means.

Furthermore, it is the association according to the invention of a passive TAG and of an active TAG which makes it possible to differentiate each container, and thus to associate with perfect differentiation all the data and events, and in particular all the data and events related to the journey of each container, thus contributing if necessary to the construction and the supply of a database of a system of "HACCP" type.

Having regard to the range characteristics of the passive and active Tags, the whole importance and role of the active Tag according to the present invention is appreciated, such that the supervisor may, as often as necessary, for example in a programmed manner or on the specific request of an operator, be in a position to scan a given space and to take stock of all the containers present in this space i.e. of all the active Tags situated in this space, logging as necessary all the containers which for the moment are unknown to it (for example because they come back from a maintenance operation that required a change of the active Tag) so as to make a list thereof, associate with each logged active Tag the associated passive Tag N° for each container (passive Tag N° situated for example in the active Tag that the unit has just logged and interrogated)—thereby implying that when the container concerned is subsequently presented in front of the gun or injection means for fluid injection it will then be recognized and correctly processed—and determine as a function of the logistic journey of each container and its characteristics the fluid injection to be applied to it.

Stated otherwise and having regard to the technical problem underlying the present invention, it is understood that the presence of the active Tag is most particularly significant for meeting the needs:

of traceability, charting;

of remote recognition of a given container in a population of containers, so as thereafter to induce the recognition of the container when the latter is presented to the injection of chilling fluid via its passive Tag.

The invention thus relates to a system for the operation and management of a fleet of refrigerated containers for transporting perishables, which containers are able to be supplied with chilling fluid, characterized by the implementation of the following measures:

each of the containers is furnished with a passive Tag comprising an item of information identifying the container concerned, as well as an active Tag comprising a temperature probe as well as a recorder linked to said probe and able to record temperature values measured by said probe;

the system comprises a gun or means for supplying the container with chilling fluid, which means are furnished with a device able to read the passive Tag of the container which is presented to it, so as in particular to take cognizance of the identification number of the passive Tag concerned;

a data acquisition and processing unit, suitable for the following operations:

for receiving said identification item of information from said device able to read the passive Tag, and for linking this passive Tag identification number with the number of the active Tag situated in the container concerned;

for calculating, by taking account of one or more data related to the logistic journey of the container concerned, to the structural and insulation characteristics of the container concerned and to the physical data of the fluid used, a quantity of fluid to be injected into the container concerned and for prescribing said gun or injection means the characteristics of the fluid injection to be carried out into the container concerned.

The system according to the invention may additionally adopt one or more of the following characteristics:

the managed containers are container crates of the type comprising a cryogenic compartment and a compartment for storing products, and furnished with connection arrangements, in particular enabling it to be hooked up to a source of the chilling fluid;

the managed containers are lorries;

said device able to read the passive Tag consists of a passive Tag reader and of its associated antenna or else of an antenna able to read the passive Tag which is presented to it, which antenna is connected to a remote passive Tag reader;

the system comprises an antenna which makes it possible to read the data of said active Tag.

The invention also relates to a method for the operation and management of a fleet of refrigerated containers for transporting perishables, which containers are able to be supplied with a chilling fluid, characterized by the implementation of the following measures:

each of the containers is furnished with a passive Tag comprising an item of information identifying the container concerned, as well as an active Tag comprising a temperature probe as well as a recorder linked to said probe and able to record temperature values measured by said probe;

there is provided a gun or means for supplying the container with chilling fluid, which means are furnished with a device able to read the passive Tag of the container which is presented to it, so as in particular to take cognizance of the identification number of the passive Tag concerned;

there is provided a data acquisition and processing unit, and the following operations are performed with the aid of this unit:

said identification item of information is received from said device, and this passive Tag identification number is linked with the number of the active Tag situated in the container concerned;

a quantity of fluid to be injected into the container concerned is calculated by taking account of one or more data related to the logistic journey of the container concerned, to the structural and insulation characteristics of the container concerned and to the physical data of the fluid used;

said gun or injection means or a system of valves supplying said gun or injection means is prescribed the characteristics of the fluid injection to be carried out into the container concerned.

According to one of the modes of implementation of the invention, the data acquisition and processing unit performs, as often as necessary, in a programmed manner or on the specific request of an operator, a scan of a given space where the fleet of containers is situated, so as to take stock of all the containers present in this space through all the associated active Tags situated in this space.

According to one of the modes of implementation of the invention, said scan makes it possible to log within the fleet situated in the space all the containers which, at the instant of the scan, are unknown to the unit and the unit then makes a list of said containers which are unknown to it, by associating with each logged active Tag the associated passive Tag number for each container.

BRIEF DESCRIPTION OF THE FIGURES

FIG. 1 is a schematic of a system for the operation and management of a fleet of refrigerated containers.

Other characteristics and advantages will emerge from the following description, given solely by way of example and given with reference to the single appended FIGURE which is a schematic representation of an embodiment of the invention.

DETAILED DESCRIPTION OF THE INVENTION

Depicted in the FIGURE is a container 1, here a "cabinet" or "trolley" type isothermal container crate, of the type comprising a cryogenic compartment and a compartment for storing products, and furnished with connection arrangements, in particular enabling it to be hooked up to a source of the chilling fluid (which for the sake of readability are not represented in the FIGURE, since additionally they are well known to the person skilled in the art).

The following elements are additionally depicted:

the container 1 is furnished with a passive Tag 2 comprising an item of information identifying the container concerned, as well as an active Tag 3 comprising a temperature probe as well as a recorder linked to said probe and able to record temperature values measured by said probe;

a gun 4 for supplying the container with chilling fluid (from a source 20 of fluid, for example a source of liquid nitrogen or else of liquid $CO_2$), able to be connected up to the connection arrangements of the container crate 1, which gun is furnished with a device 5 able to read the passive Tag 2 of the container which is presented to it, so as in particular to take cognizance of the identification number of the passive Tag concerned;

a data acquisition and processing unit 10, suitable for the following operations:

for receiving said item of information identifying the container crate 1 from said device 5, and for linking this passive Tag identification number with the number of the active Tag 3 situated in the container concerned;

for calculating, by taking account of data related to one or more of the following characteristics: to the logistic journey of the container concerned, to the structural and insulation characteristics of the container concerned, as well as to the physical data of the fluid used, a quantity of fluid to be injected into the container concerned and for prescribing said gun (through the valve 30) the fluid injection (quantity, duration) to be carried out into the container crate.

The unit 10 is furnished with an antenna which makes it possible to read the data of the active Tags (such as the Tag 3) entering into its reading range.

The operator 40 is there for example and in particular to enter the data of the logistic journey of each container crate into the acquisition and processing unit 10.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A system for the operation and management of a fleet of refrigerated containers for transporting perishables, which containers are able to be supplied with chilling fluid, comprising:
- a plurality of containers each furnished with a passive Tag comprising an item of information identifying the container, an active Tag comprising a temperature probe, and a recorder linked to said probe and able to record temperature values measured by said probe;
- a supply element configured and adapted to supply one or more of the containers with chilling fluid, said supply element furnished with a device able to read the passive Tag of the container presented thereto so as in particular to take cognizance of an identification number of the passive Tag; and
- a data acquisition and processing unit, suitable for the following operations:
  - for receiving said identification item of information from said device, and for linking the passive Tag identification number with a number of the active Tag situated in the container; and
  - for calculating, by taking account of one or more data related to a logistic journey of the container, to a structural and insulation characteristics of the container, and to a physical data of the fluid used, a quantity of fluid to be injected into the container and for prescribing said supply element the characteristics of the fluid injection to be carried out into the container.

2. The system of claim 1, wherein the containers are container crates comprising a cryogenic compartment and a compartment for storing products, and furnished with connection arrangements.

3. The system of claim 1, wherein the containers are trucks.

4. The system of claim 1, wherein said device able to read the passive Tag consists of a passive Tag reader and of its associated antenna or else of an antenna able to read the passive Tag which is presented thereto, which antenna is connected to a remote passive Tag reader.

5. The system of claim 1, further comprising an antenna which makes it possible to read the data of said active Tag.

6. The system of claim 5, wherein the antenna makes it possible to read the data of said active Tag from a hundred meters.

7. The system of claim 1, wherein the containers are container crates of the type comprising a cryogenic compartment and a compartment for storing products, and furnished with connection arrangements enabling said managed containers to be hooked up to a source of the chilling fluid.

8. A method for the operation and management of a fleet of refrigerated containers for transporting perishables, which containers are able to be supplied with a chilling fluid, the method comprising the steps of:
- furnishing each of the refrigerated containers with a passive Tag comprising an item of information identifying the refrigerated container, an active Tag comprising a temperature probe, and a recorder linked to said temperature probe and able to record temperature values measured by said temperature probe;
- providing a supply element adapted and configured to supply the refrigerated container with chilling fluid, said supply element being furnished with a device able to read the passive Tag of the refrigerated container, so as in particular to take cognizance of an identification number of the passive Tag concerned;
- providing a data acquisition and processing unit, and the following operations are performed with the aid of said data acquisition and processing unit:
  - receiving said identification number from said device, and linking the identification number with a number of the active Tag situated in the refrigerated container;
  - calculating a quantity of chilling fluid to be injected into the refrigerated container by taking account of one or more data related to a logistic journey of the refrigerated container, to the structural and insulation characteristics of the refrigerated container, and to the physical data of the chilling fluid used;
  - prescribing said supply element the characteristics of the chilling fluid injection to be carried out into the refrigerated container.

9. The method of claim 8, wherein the data acquisition and processing unit performs, as often as necessary, in a programmed manner or on the specific request of an operator, a scan of a given space where the fleet of refrigerated containers is situated, so as to take stock of all the refrigerated containers present in this space through all the associated active Tags situated in this space.

10. The method of claim 9, wherein said scan makes it possible to log within the fleet situated in the space all the refrigerated containers which, at the instant of the scan, are unknown to the data acquisition and processing unit, and in that the data acquisition and processing unit then makes a list of said refrigerated containers which are unknown to it, by associating with each logged active Tag the associated passive Tag number for each refrigerated container.

11. The method of claim 9, wherein the given space may range a hundred meters from the data acquisition and processing unit.

* * * * *